United States Patent
Swanson et al.

(10) Patent No.: US 12,405,175 B2
(45) Date of Patent: Sep. 2, 2025

(54) METHOD FOR ESTIMATING OUTLET AIR TEMPERATURE

(71) Applicant: GENTHERM INCORPORATED, Northville, MI (US)

(72) Inventors: Jeremy Swanson, Ypsilanti, MI (US); Tyler Myers, Plymouth, MI (US); Chad Westerman, Milford, MI (US); Satya Naren Karthik Mandali, Farmington Hills, MI (US); Ankit Tiwari, Farmington Hills, MI (US); Vikrant Varandani, Novi, MI (US)

(73) Assignee: GENTHERM INCORPORATED, Novi, MI (US)

( * ) Notice: Subject to any disclaimer, the term of this patent is extended or adjusted under 35 U.S.C. 154(b) by 0 days.

(21) Appl. No.: 18/842,245

(22) PCT Filed: Mar. 3, 2023

(86) PCT No.: PCT/US2023/014476
§ 371 (c)(1),
(2) Date: Aug. 28, 2024

(87) PCT Pub. No.: WO2023/168061
PCT Pub. Date: Sep. 7, 2023

(65) Prior Publication Data
US 2025/0102374 A1    Mar. 27, 2025

Related U.S. Application Data

(60) Provisional application No. 63/316,779, filed on Mar. 4, 2022.

(51) Int. Cl.
*G01K 13/024*    (2021.01)
*G01K 7/42*    (2006.01)

(52) U.S. Cl.
CPC .............. *G01K 13/024* (2021.01); *G01K 7/42* (2013.01); *G01K 2201/02* (2013.01)

(58) Field of Classification Search
None
See application file for complete search history.

(56) References Cited

U.S. PATENT DOCUMENTS

| | | | |
|---|---|---|---|
| 6,727,467 B1 | 4/2004 | Hadzizukic et al. | |
| 7,178,344 B2 | 2/2007 | Bell | |
| (Continued) | | | |

FOREIGN PATENT DOCUMENTS

| | | |
|---|---|---|
| CN | 104081172 A | 10/2014 |
| CN | 112955723 A | 6/2021 |
| (Continued) | | |

OTHER PUBLICATIONS

Huizenga et al., A model of human physiology and comfort for assessing complex thermal environments, Center for Environmental Design Research, University of California, Berkeley, CA 94720-1839 (2021).

(Continued)

*Primary Examiner* — Lisa M Caputo
*Assistant Examiner* — Cynthia L Davis
(74) *Attorney, Agent, or Firm* — The Dobrusin Law Firm, P.C.

(57) ABSTRACT

A method for estimating a temperature of an air stream. The method comprises determining a first and second heat transfer rate to or from the air stream, and optionally one or more additional heat transfer rates to or from the air stream. The first and second heat transfer rates are based on a first and second temperature, respectively, applied to the air stream. The rate of change of the air stream temperature is calculated based on the first and second heat transfer rates and optionally the one or more additional heat transfer rates. An (Continued)

estimated temperature of the air stream is updated from a prior program cycle based on the rate of change of the air stream temperature and the estimated air stream temperature from the prior program cycle.

17 Claims, 3 Drawing Sheets

(56) References Cited

U.S. PATENT DOCUMENTS

| | | |
|---|---|---|
| 7,196,288 B2 | 3/2007 | Weiss et al. |
| 7,205,902 B2 | 4/2007 | Kiribayashi |
| 7,338,117 B2 | 3/2008 | Iqbal et al. |
| 7,824,099 B2 | 11/2010 | He et al. |
| 8,143,554 B2 | 3/2012 | Lofy |
| 9,002,568 B2 | 4/2015 | Datta et al. |
| 9,103,573 B2 | 8/2015 | Goenka et al. |
| 9,121,414 B2 | 9/2015 | Lofy et al. |
| 9,266,454 B2 | 2/2016 | Barfuss et al. |
| 9,298,207 B2 | 3/2016 | Li |
| 9,333,888 B2 | 5/2016 | Helmenstein |
| 9,399,480 B2 | 7/2016 | Zhang et al. |
| 9,555,686 B2 | 1/2017 | Ranalli et al. |
| 9,657,963 B2 | 5/2017 | Lazanja et al. |
| 9,857,107 B2 | 1/2018 | Inaba et al. |
| 10,266,031 B2 | 4/2019 | Steinman et al. |
| 10,583,713 B2 | 3/2020 | Sagou et al. |
| 2003/0109212 A1 | 6/2003 | Hayashi et al. |
| 2009/0159256 A1 | 6/2009 | Isoda et al. |
| 2014/0278201 A1 | 9/2014 | Shimizu |
| 2014/0290631 A1* | 10/2014 | Henry .................. F02M 26/33 123/568.12 |
| 2016/0257272 A1 | 9/2016 | Ruthinowski |
| 2017/0129375 A1 | 5/2017 | Zhang |
| 2017/0182861 A1 | 6/2017 | Steinman et al. |
| 2018/0136051 A1 | 5/2018 | Ishii |
| 2018/0195911 A1 | 7/2018 | Kakade et al. |
| 2018/0345753 A1 | 12/2018 | Beloe |
| 2019/0101945 A1 | 4/2019 | Marquette et al. |
| 2019/0291613 A1 | 9/2019 | Gupta et al. |
| 2019/0366799 A1 | 12/2019 | Czerwonka et al. |
| 2020/0103293 A1* | 4/2020 | Rud .................. G01K 15/007 |
| 2020/0119625 A1* | 4/2020 | Yang .................. H02H 7/0852 |
| 2020/0391572 A1 | 12/2020 | Tsukagishi et al. |
| 2021/0276463 A1 | 9/2021 | Wolas et al. |
| 2022/0066067 A1 | 3/2022 | D'Amelio et al. |

FOREIGN PATENT DOCUMENTS

| | | |
|---|---|---|
| DE | 102019108283 A1 | 10/2020 |
| FR | 3 088 259 A1 | 5/2020 |
| JP | 2005-306196 A | 11/2005 |
| JP | 2007-010436 A | 1/2007 |
| JP | 2007-078475 A | 3/2007 |
| JP | 2009-214675 A | 9/2009 |
| JP | 2018-081467 A | 5/2018 |
| JP | 2018-135833 A | 8/2018 |
| JP | 2022-501599 A | 1/2022 |
| KR | 10-2003-0046524 A | 6/2003 |
| WO | 2008/115831 A1 | 9/2008 |
| WO | 2018/049159 A1 | 3/2018 |
| WO | 2020094981 A1 | 5/2020 |
| WO | 2020/112902 A1 | 6/2020 |
| WO | 2021/102449 A1 | 5/2021 |
| WO | 2021/102450 A1 | 5/2021 |
| WO | 2021/126576 A1 | 6/2021 |
| WO | 2021/158860 A1 | 8/2021 |

OTHER PUBLICATIONS

International Search Report & Written Opinion, PCT Application No. PCT/US2023/014476 dated Jun. 12, 2023.
International Preliminary Report on Patentability, PCT Application No. PCT/US2023/014476 dated May 24, 2024.

* cited by examiner

METHOD FOR ESTIMATING OUTLET AIR TEMPERATURE

CROSS-REFERENCE TO RELATED APPLICATIONS

The present application is a national phase of International Application No. PCT/US2023/014476, filed Mar. 3, 2023, which claims priority to U.S. Provisional Application No. 63/316,779, filed Mar. 4, 2023, both of which being incorporated herein by reference in their entireties for all purposes.

FIELD

The present disclosure relates to a method for estimating the temperature of an air stream expelled through an outlet. The estimated air stream temperature is utilized for controlling the operation of thermal effectors.

BACKGROUND

Some climatized vehicle systems operate under a set of pre-determined discrete setpoints, which are selected by occupants with the actuation of buttons, dials, and the like. One draw back to these systems is the inability to regulate temperature between the setpoints. Another drawback is the continuous changing of the temperature setpoints during operation of the vehicle.

To address these challenges, some climatized vehicle systems employ sensors that monitor parameters such as the temperature of thermal effectors, blower speed, outside temperature, sun radiation, cabin air temperature, humidity, and the number of occupants. The setpoint selected by the occupant is then correlated, via lookup tables, to these parameters and thus the operation of thermal effectors (e.g., the duty cycle of a thermoelectric device) is directed by both the setpoint and the parameters. These systems operate under a finite number of pre-determined scenarios. One drawback to these systems is the large degree of calibration effort undertaken to account for the possible scenarios the vehicle may be exposed to. By way of example, systems are typically calibrated to account for driving in different seasons, geographical climates, weather conditions, and the like. Moreover, the calibrations are performed for each make, model, model year, and trim level of vehicle due to the different effects such parameters have on different vehicle builds, including the quantity and location of thermal effectors.

Typically, sensors and thermal effectors are calibrated individually. Thus, calibrations are undertaken for individual effectors. Due to such individual treatment, thermal effectors typically do not communicate with one another to cooperate in conditioning the vehicle or sharing energy usage. Thus, where an air stream is conditioned by multiple thermal effectors, ramp-up to the setpoint temperature typically proceeds slowly in an abundance of caution not to cause discomfort to the occupant.

Similarly, as the calibration accounts for cabin air temperature rather than an air stream temperature as it emits from an outlet, the operation of thermal effectors is undertaken cautiously to avoid overheating or overcooling occupants, which may cause discomfort. Thus, the time it takes for an air stream to arrive at the selected setpoint temperature is longer relative to other methods.

Some climatized vehicle systems calibrate thermal effectors to specific cabin air temperatures. However, cabin air temperature does not accurately characterize the temperature of an air stream exiting the outlet (e.g., a vent). While providing a sensor proximate to the outlet may detect the temperature, several challenges are realized. Repeatable accuracy and precision in the location of these sensors may be needed for thermal effector operation to cooperate with the system's calibration. However, consistent location of these sensors may be difficult in the manufacturing process. Furthermore, the automotive industry is concerned with cost reduction, so additional sensors with their attendant costs is typically not a favorable solution. Sensors provided in or proximate to the outlet, typically protruding into an airstream, exposes sensors to wear and damage, which can diminish the integrity of the sensor over time.

There is a need for a method to accurately and precisely estimate the temperature of an air stream at an outlet.

There is a need for a method to utilize existing sensor and/or controller hardware to estimate air stream temperatures.

There is a need for a method that provides control of thermal effectors to a dynamic outlet temperature, unconstrained by pre-determined setpoints.

There is a need for a method that obviates the need for calibrations to populate lookup tables.

There is a need for a method that provides for collaboration between thermal effectors to condition a common air stream and share energy usage.

There is a need for a method that provides for more rapid arrival at setpoints (e.g., temperature and air speed) selected by occupants, relative to conventional methods.

SUMMARY

The present disclosure provides for a method that may address at least some of the needs identified above. The method may be for estimating the temperature of an airstream. The temperature of the air stream at or proximate to an outlet (e.g., vent) may be estimated. The air stream may be provided to a cabin of a vehicle.

The method may comprise determining a first heat transfer rate to or from the air stream based on a first temperature applied to the air stream.

The method may comprise determining a second heat transfer rate to or from the air stream based on a second temperature applied to the air stream.

The method may comprise calculating a rate of change of the air stream temperature based on the first and second heat transfer rates and optionally one or more additional heat transfer rates.

The method may comprise updating an estimated temperature of the air stream from a prior program cycle based on the rate of change of the air stream temperature and the estimated air stream temperature from the prior program cycle.

The first temperature may be applied by a heat exchanger. The heat exchanger may be located on and/or within a conduit through which the air stream travels.

The method may comprise obtaining the first temperature. The method may comprise obtaining the estimated air stream temperature from the prior program cycle. The first heat transfer rate may be calculated from the difference between the first temperature and the estimated air stream temperature from the prior program cycle, a thermal resistance, a surface area through which heat transfer occurs, or any combination thereof. If a prior program cycle value is not available, the estimated air stream temperature may be substituted with a temperature sensed by a local sensor. The thermal resistance may be that of the heat exchanger.

The second temperature may be applied by a conduit through which the air stream travels. The second temperature may be applied by the conduit from the region where the air stream enters the conduit to the region where an outlet is located. The method may comprise obtaining the second temperature. The method may comprise obtaining the estimated air stream temperature from the prior program cycle. The second heat transfer rate may be calculated from the difference between the second temperature and the estimated air stream temperature from the prior program cycle, a thermal resistance, a surface area through which the heat transfer occurs, or any combination thereof. If a prior program cycle value is not available, the estimated air stream temperature may be substituted with a temperature sensed by a local sensor. The thermal resistance may be that of free convective air.

The air stream may be emitted from an outlet of a vehicle component. The vehicle component may include a seat, a headrest, a door panel, an instrument panel, a headliner, a center console, a leg panel, or any combination thereof.

The heat exchanger may thermally communicate with one or more thermal effectors. The method may comprise determining a heat transfer rate between the one or more thermal effectors and the heat exchanger, based on a temperature of the one or more thermal effectors.

The temperature of the one or more thermal effectors may be inputs provided by sensors. The sensors may include a negative temperature coefficient (NTC) resistor, a resistance temperature detector (RTD), a thermocouple, a semiconductor-type sensor, or any combination thereof.

The conduit may thermally communicate with an environment. The method may comprise determining a heat transfer rate to or from the conduit, based on a temperature applied to the conduit by the environment.

DETAILED DESCRIPTION

Introduction

Figure 1:
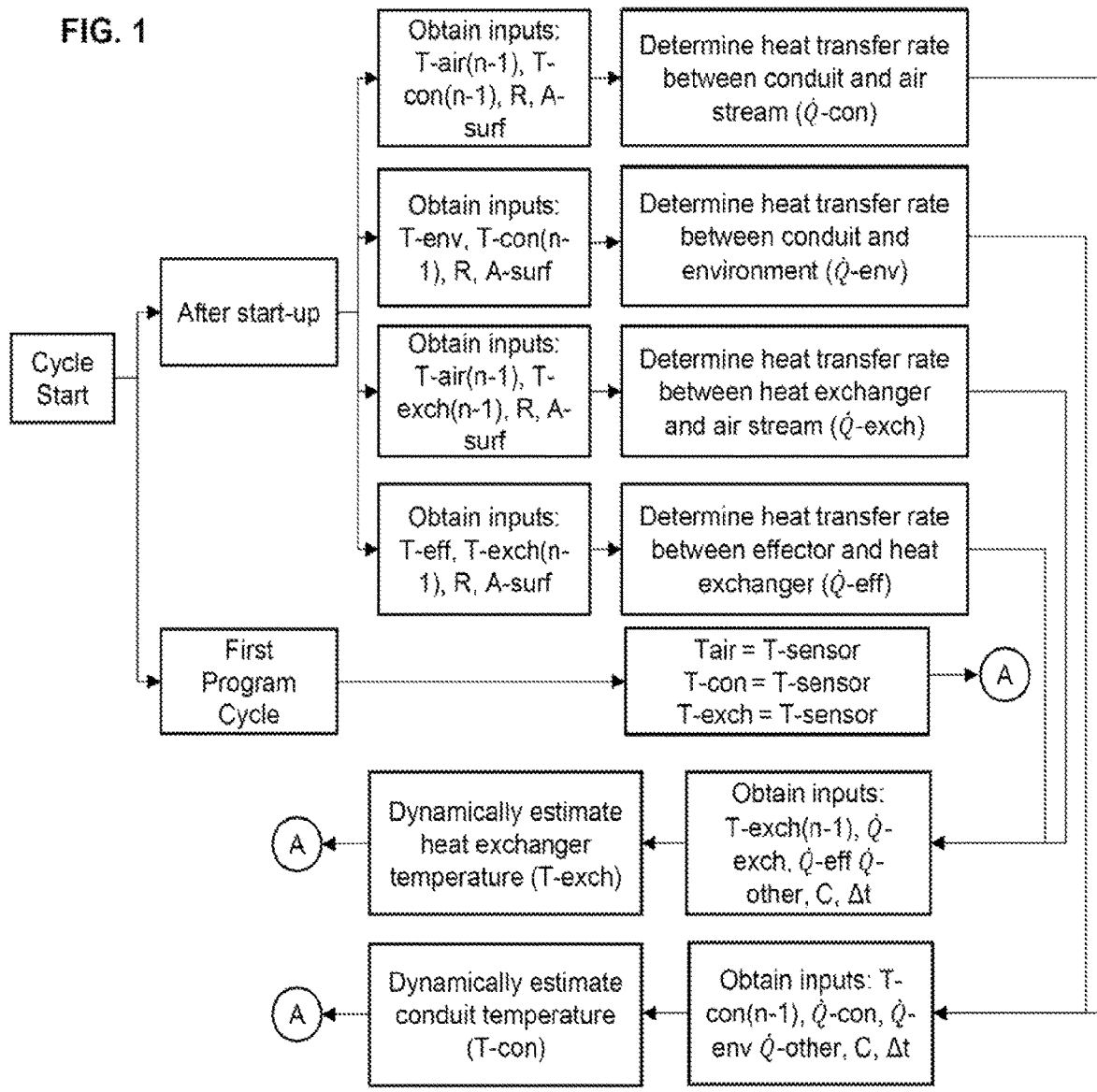
FIG. 1 illustrates a flowchart of the method of the present disclosure.

The present disclosure provides for a method for dynamically estimating the temperature of an air stream. The air stream may be expelled at an outlet (e.g., a vent). The dynamic estimation may be that of the air stream temperature at or proximate to the outlet. Prior to reaching the outlet, the air stream may travel through one or more conduits and/or exchange heat with the one or more conduits. One or more heat exchangers and/or thermal effectors may be disposed in or on the one or more conduits. The air stream may exchange heat with the one or more thermal effectors and/or heat exchangers. The air stream may be provided to the cabin of a vehicle. The air stream may thermally communicate with cabin air and/or one or more occupants.

The air stream may originate from an outlet. The outlet may be located in a vehicle component. The vehicle component may include, but is not limited to, a seat, a headrest, a door panel, an instrument panel, a headliner, a center console, a leg panel, or any combination thereof. The vehicle component may be any component within the cabin of the vehicle. The air stream may be climate controlled. That is, the air stream may be heated and/or cooled to provide comfort to occupants.

Non-limiting examples of vents located in or on seats are described in U.S. Publication Nos. 2017/0129375 A1 and 2021/0276463 A1, incorporated herein by reference for all purposes. A non-limiting example of a vent located in a headrest is described in U.S. Pat. No. 9,333,888 B2, incorporated herein by reference for all purposes. A non-limiting example of a vent located in a door is described in U.S. Publication No. 2017/0182861 A1, incorporated herein by reference for all purposes. A non-limiting example of vents located in a headliner is described in U.S. Pat. No. 10,266,031 B2, incorporated herein by reference for all purposes. Non-limiting examples of other systems for conditioning air streams are described in U.S. Pat. Nos. 9,103,573 B2 and 9,555,686 B2, incorporated herein by reference for all purposes.

The temperature of the air stream may be regulated by one or more thermal effectors ("effectors"). The thermal effectors may include convective effectors. The convective effectors may heat and/or cool one or more air streams that are delivered to occupants. The thermal effectors may cooperate with one or more heat exchangers. The heat exchangers may function to thermally communicate with an air stream. The heat exchangers may be fabricated from a thermally conductive material (e.g., thermal conductivity of about 100 W/(m·K) or more, more preferably about 200 W/(m·K) or more, or even more preferably about 300 W/(m·K) or more). The heat exchanger may be adapted with a surface area over which an air stream travels. To this end, the heat exchanger may include a plurality of protrusions, fins, or corrugations, although any other suitable shape is contemplated by the present teachings. Non-limiting examples of suitable heat exchangers are described in U.S. Pat. Nos. 7,178,344 B2 and 8,143,554 B2, incorporated herein by reference for all purposes.

Heating and/or cooling may be achieved by the operation of one or more resistance elements. thermoelectric devices, or both. Heating and/or cooling may utilize a fluid medium (e.g., air) that transports heat to and/or from the vehicle cabin environment and/or an occupant. The fluid medium may be caused to transport by one or more fluid moving devices (e.g., blowers). A non-limiting example of a resistance element is described in U.S. Pat. No. 9,657,963 B2, incorporated herein by reference for all purposes. A non-limiting example of a thermoelectric device is described in U.S. Pat. No. 9,857,107 B2, incorporated herein by reference for all purposes. Non-limiting examples of blowers are described in International Publication No. WO 2008/115831 A1 and U.S. Pat. No. 9,121,414 B2, incorporated herein by reference for all purposes.

The thermal effectors may be controlled to provide heating and/or cooling that corresponds with an operation mode and/or a setpoint temperature. The operation mode and/or setpoint temperature may be determined by occupants' actuation of one or more knobs, buttons, dials, toggles, switches, the like, or any combination thereof, otherwise referred to herein as human-machine interfaces. The operation mode and/or setpoint temperature may be determined by an autonomous control system. These systems may account for one or more sensor inputs and regulate the setpoints autonomously via one or more controllers. The operation mode may be ON or OFF. The thermal effectors may be operated by a duty cycle (e.g., pulse width modulation, constant current control, or the like). The duty cycle may operate to ramp-up to achieve, and then maintain the setpoint temperature, at least until the operation mode changes or the setpoint temperature changes by the direction of the occupant or the autonomous system. The duty cycle may operate in accordance with the difference between a dynamically estimated temperature and the setpoint temperature.

The dynamic temperature estimation of the present disclosure may account for the complex system of heat exchanges that occur throughout the vehicle. Outside temperature, humidity, sun radiation, occupants' body temperatures, cabin air temperature, and/or the temperature of vehicle components may contribute to such heat exchanges. Moreover, these parameters may change over time due to the operation of thermal effectors and/or the changing environment within and/or outside the vehicle. Particularly, the present disclosure is concerned with heat exchanges that ultimately travel to the body of an occupant. In this manner, thermal comfort may be provided to occupants. One exemplary model of heat transfer relative to the human body in transient, non-uniform environments is discussed in Huizenga et al., A model of human physiology and comfort for assessing complex thermal environments, Center for Environmental Design Research, University of California, Berkeley, CA 94720-1839.

The dynamic estimation may be based on principles of physics. One or more heat transfer rates may be calculated, and an air stream temperature may be estimated based on the heat transfer rates. The rate of heat transfer between two mediums is generally based on the difference in temperature between the two mediums, the surface area across which the heat transfer is occurring, one or more thermal resistances, or any combination thereof.

The method of the present disclosure may estimate the temperature of an air stream and continuously update the temperature estimation. Thus, the method of the present disclosure may adapt to constantly fluctuating ambient cabin conditions. The method of the present disclosure may adapt in real-time, providing consistent thermal comfort to occupants.

The present disclosure provides for a unique method that may rely on the inputs from the existing sensors that measure the temperature of thermal effectors and/or any other existing sensors in the vehicle. The temperature sensor may include a negative temperature coefficient (NTC) resistor, a resistance temperature detector (RTD), a thermocouple, a semiconductor-type sensor, or any combination thereof. Thus, the method of the present disclosure may not require temperature sensors to be located in or proximate to an air outlet.

The dynamic estimation may be based on a relatively small set of pre-determined values compared to conventional methods and systems. These values may include thermal resistances, thermal capacitances, surface areas, program cycle times, or any combination thereof. These values are non-limiting and others may be realized by the present disclosure. These values may be stored in a transient and/or non-transient memory storage medium.

The dynamic estimation may involve calculating one or more heat transfer rates based on one or more of the foregoing inputs. The heat transfer rates may include those between one or more thermal effectors and one or more heat exchangers, between one or more heat exchangers and the air stream, between one or more thermal effectors and the air stream, between one or more conduits and the air stream, between one or more conduits and an environment, between any number of other sources and the air stream, or any combination thereof. These heat transfer rates are non-limiting and other heat transfer rates may be realized by the present disclosure.

The dynamic estimation may employ one or more look-up tables, transfer functions, equations, or any combination thereof. Preferably, the dynamic estimation may be determined by one or more equations and/or transfer functions characterizing the physics principles of heat transfer between mediums. The equations and/or transfer functions may be provided inputs by sensors, calculations from prior program cycles, pre-determined values (e.g., thermal resistances and surface areas), or any combination thereof. Sensor inputs may be obtained in real-time. Prior program calculations and/or pre-determined values may be obtained from a transient or non-transient memory storage medium.

The method of the present disclosure may bridge the gap between the analytical theory and the actual application. In this regard, some approximations and/or assumptions may be made for the real-life operation of thermal effectors to cooperate with the analytical theory. The concept of lump capacitance may be employed to this end. That is, a three-dimensional solid object undergoing a changing thermal environment can be assumed to be at a uniform bulk temperature thus neglecting temperature gradients throughout the thickness of the object.

Estimation, as referred to herein, may mean the calculation of a parameter understanding that the result of such calculation may not exactly correspond with the actual value (e.g., temperature of an air stream at an outlet). Thus, the result of such calculation may be an estimate of the actual value. The system and method of the present disclosure may provide an estimate that deviates about 10% or less, more preferably 5% or less, or even more preferably 1% or less from the actual value.

Any calculation, dynamic estimation, storage, transmission, and/or obtaining step recited herein may be performed by one or more controllers. The controllers may include one or more dedicated effector controllers, vehicle controllers, or both. Calculations and dynamic estimations may be performed by one controller or distributed between a plurality of controllers. Any non-transient values (e.g., pre-determined values) or inputs may be stored locally on and/or remote from the controllers. Any inputs that are calculated or estimated from prior program cycles may be stored locally on and/or remote from the controllers. Any inputs from one or more prior program cycles may be stored temporarily on and/or remote from the controllers. Any calculated or estimated inputs from one or more prior program cycles may be replaced or updated by calculated or estimated inputs from a current program cycle. The foregoing is applicable to all embodiments.

Any communication or transmission between different controllers, sensors, and/or other devices may be via a local interconnect network (LIN) bus. Communications or transmissions may occur from a sensor to a controller, from a controller to another controller, between a controller and a thermal effector, between a controller and a blower, or any combination thereof. By way of example but not limitation, a temperature sensor may transmit a signal to a vehicle controller, and then the vehicle controller may transmit the signal to a dedicated effector controller. The foregoing is applicable to all embodiments.

Vehicle, as referred to herein, may mean any automobile, recreational vehicle, sea vessel, air vessel, the like, or any combination thereof. While the present disclosure discusses the conditioning of air streams within a vehicle, the teachings herein may be adapted for any space that is conditioned with air streams that may thermally communicate with individuals. By way of example, the present teachings may be applied to furniture (e.g., chairs and beds), buildings, the like, or any combination thereof.

Dynamically Estimating Air Stream Temperature

The method may comprise dynamically estimating the temperature of an air stream at or proximate to an outlet ($T_{est}$). The temperature may be dynamically estimated based on the heat transfer rates of the air stream to or from one or more surrounding mediums. The temperature may be dynamically estimated based on the heat transfer rate between one or more heat exchangers and the air stream ($\dot{Q}_{exch}$), the heat transfer rate between one or more thermal effectors and the air stream ($\dot{Q}_{eff}$), the heat transfer rate between one or more conduits and the air stream ($\dot{Q}_{con}$), the heat transfer rate between any number of other sources and the air stream ($\dot{Q}_{other}$), or any combination thereof.

The change in temperature of the air stream per unit time ($\dot{T}$) may be determined from the foregoing heat transfer rates.

With a known program cycle time ($\Delta t$) (e.g., 1 second or less, 50 milliseconds or less, 30 milliseconds or less, or even 10 milliseconds or less), a temperature change ($\Delta T$) over the cycle duration may be determined from the change in temperature of the air stream per unit time, per the following equation.

$$\dot{T} \times \Delta t = \Delta T \qquad \text{Eq. A}$$

The temperature change may be added to the initial or prior air stream temperature ($T_{(n-1)}$) to obtain the estimated temperature of the air stream ($T_{est}$), per the following equation.

$$T_{(n-1)} + \Delta T = T_{est} \qquad \text{Eq. B}$$

The initial or prior air stream temperature may be assumed to be equal to the temperature sensed by a local sensor upon start up. These sensors may include those disposed in the cabin, on heating elements, in vents, or otherwise. Any sensors located in the vehicle may provide the temperature at start-up. After start-up, the initial or prior air stream temperature may be the estimated temperature from a prior program cycle.

The estimated temperature of the air stream may be employed in the operation of one or more thermal effectors (e.g., convective effectors). That is, based upon the dynamic estimation of the temperature, the power cycling and/or ON/OFF command of a thermal effector may be controlled.

The methods for determining the heat transfer rate between the heat exchanger and the air stream ($\dot{Q}_{exch}$), the heat transfer rate between the thermal effector and the air stream ($\dot{Q}_{eff}$), the heat transfer rate between the conduit and the air stream ($\dot{Q}_{con}$), the heat transfer rate between any number of other sources and the air stream ($\dot{Q}_{other}$), are provided hereunder.

Heat Transfer Rate Between the Conduit and the Air Stream

Air provided to the cabin via an outlet typically originates from a blower, travels through one or more conduits, thermally communicates with one or more heat exchangers, thermally communicates with one or more thermal effectors, or any combination thereof.

The air stream may thermally communicate with one or more conduits through which the air stream travels. The air stream may thermally communicate with the one or more conduits from the region where the air is expelled by a blower to the region where the air exits the outlet.

The method may comprise calculating the heat transfer rate between the conduit and the air stream ($\dot{Q}_{con}$).

The method may comprise obtaining a conduit temperature ($T_{con}$) and an air stream temperature ($T_{air}$). The conduit temperature may be provided by an input from one or more sensors (e.g., NTC sensor). The conduit temperature may be assumed equal to the temperature sensed by a local sensor upon start-up of the vehicle. The conduit temperature may be provided by a dynamic estimation taught herein after start-up. The dynamic estimation may be from a prior program cycle. The air stream temperature may be assumed equal to the temperature sensed by a local sensor upon start-up of the vehicle. The air stream temperature may be provided by a dynamic estimation taught herein after start-up. The dynamic estimation may be from a prior program cycle.

The method may comprise obtaining a thermal resistance. The thermal resistance may be that of the conduit ($R_{con}$). The thermal resistance may be a pre-determined value. The thermal resistance may be unique to different materials, layer thicknesses, and the like. Thus, different makes, models, and model years, with different vehicle component builds, may be associated with unique thermal resistances. The thermal resistance may be obtained from a memory storage medium.

The method may comprise obtaining the surface area through which heat transfer occurs ($A_{surf}$). The surface area may be associated with the dimensions of the conduit (e.g., length of the inner cross-sectional perimeter and/or length through which the air stream flows from an inlet to the outlet). The surface area may be a pre-determined value. The surface area may be obtained from a memory storage medium.

The heat transfer rate relative to the conduit ($\dot{Q}_{con}$) may be calculated from the temperature of the conduit ($T_{con}$), the temperature of the air stream ($T_{air}$), the thermal resistance of the conduit ($R_{con}$), the surface area through which heat transfer occurs ($A_{surf}$), or any combination thereof.

The heat transfer rate ($\dot{Q}_{con}$) may be determined by the following equation.

$$\dot{Q}_{con} = \frac{(T_{air} - T_{con}) \times A_{surf}}{R_{con}} \qquad \text{Eq. C}$$

The heat transfer rate between the conduit and the air stream may be employed in the dynamic estimation of the air stream temperature. The heat transfer rate between the conduit and the air stream may be employed in the dynamic estimation of the conduit temperature.

Heat Transfer Rate Between the Environment and the Conduit

The conduit may extend through one or more vehicle components. Typically, the conduit may be hidden from the view of occupants. The temperature of the conduit may be influenced by the temperature applied to exterior surfaces of the conduit, the exterior surfaces opposing the surfaces contacting the air stream. The conduit may extend through a solid object and/or open space. By way of example, a conduit may extend through one or more layers (e.g., cushion and/or spacer layers) in a seat. By way of another example, a conduit may extend through an open space defined by the interior portion of a dashboard. The solid object and/or open space may be referred to herein, with respect to the conduit, as an environment.

The method may comprise calculating the heat transfer rate between the conduit and the environment ($\dot{Q}_{env}$).

The method may comprise obtaining a conduit temperature ($T_{con}$) and an environment temperature ($T_{env}$). The conduit temperature may be provided by an input from one or more sensors (e.g., NTC sensor). The conduit temperature may be assumed equal to the temperature sensed by a local sensor upon start-up of the vehicle. The conduit temperature may be provided by a dynamic estimation taught herein after start-up. The dynamic estimation may be from a prior program cycle. The environment temperature may be provided by an input from one or more sensors (e.g., NTC sensor). The environment temperature may be assumed equal to the temperature sensed by a local sensor upon start-up of the vehicle. The environment temperature may be provided by a dynamic estimation taught herein after start-up. The dynamic estimation may be from a prior program cycle.

Typically, one or more sensors may be disposed within the cabin of the vehicle to determine the temperature of the ambient air. These sensors are existing in the vehicle and may be employed by the present method. Where the environment through which the conduit extends is an open space, the temperature of that space may be commensurate with the sensed temperature of the ambient air. Where the environment through which the conduit extends is a solid object, the temperature of that solid may be commensurate with the sensed temperature of the ambient air. In some aspects, the solid object may be acted upon incidentally by one or more thermal effectors. By way of example, conduits venting air out of a seat may incidentally thermally communicate with one or more seat heaters. In this case, the temperature of the solid object thermally communicating with one or more thermal effectors may be dynamically estimated with a similar method as taught herein.

The method may comprise obtaining a thermal resistance. The thermal resistance may be that of the conduit ($R_{con}$). The thermal resistance may be a pre-determined value. The thermal resistance may be obtained from a lookup table. The thermal resistance may be unique to different materials, material thicknesses, and the like. Thus, different makes, models, and model years, with different vehicle component builds, may be associated with unique thermal resistances. The thermal resistance may be obtained from a memory storage medium.

The method may comprise obtaining the surface area through which heat transfer occurs ($A_{surf}$). The surface area may be associated with the dimensions of the conduit (e.g., length of the cross-sectional outer perimeter and/or length which the conduit extends through the environment). The surface area may be a pre-determined value. The surface area may be obtained from a memory storage medium. The surface area may be obtained from a lookup table.

The heat transfer rate relative to the conduit may be calculated from the temperature of the conduit ($T_{con}$), the temperature of the environment ($T_{env}$), the thermal resistance of the conduit ($R_{con}$), the surface area through which heat transfer occurs ($A_{surf}$), or any combination thereof.

The heat transfer rate ($\dot{Q}_{env}$) may be determined by the following equation.

$$\dot{Q}_{env} = \frac{(T_{con} - T_{env}) \times A_{surf}}{R_{con}} \quad \text{Eq. D}$$

The heat transfer rate between the environment and the conduit may be employed in the dynamic estimation of the conduit temperature.

Dynamically Estimating the Conduit Temperature

The method may comprise dynamically estimating the temperature of the conduit ($T_{con}$). The temperature of the conduit may be assumed to be equal to the temperature sensed by a local sensor upon start-up of the vehicle. The conduit temperature may be provided by a dynamic estimation taught herein after start-up.

The temperature of the conduit may be employed in order to determine the heat transfer rate between the conduit and the air stream, as disclosed hereinbefore. After this value is initially determined it may be utilized by a subsequent program cycle.

The method may comprise obtaining the heat transfer rate between the environment and the conduit, the heat transfer rate between the conduit and the air stream, the heat transfer rate between any other medium and the conduit, or any combination thereof. The heat transfer rate relative to the environment may be determined as disclosed hereinbefore. The heat transfer rate relative to the air stream may be determined as disclosed hereinbefore.

The method may comprise obtaining a thermal capacitance. The thermal capacitance may be that of the conduit ($C_{con}$). The thermal capacitance may be a pre-determined value. The thermal capacitance may be unique to different materials, material thicknesses, and the like. Thus, different makes, models, and model years, with different vehicle component builds, may be associated with unique thermal capacitances. The thermal capacitance may be obtained from a memory storage medium. The thermal capacitance may be obtained from a lookup table.

The method may comprise obtaining a time between program cycles. The program cycle time may be constant or may vary. The program cycle time may be obtained from a memory storage medium. The program cycle time may be determined by a timer.

The method may comprise obtaining a prior temperature of the conduit. The prior temperature of the conduit may be obtained from a dynamic estimation from a prior program cycle. The prior temperature of the conduit may be assumed equal to the temperature sensed by a local sensor upon start-up of the vehicle.

The temperature of the conduit may be dynamically estimated from the sum of the heat transfer rate between the environment and the conduit ($\dot{Q}_{env}$), the heat transfer rate between the conduit and the air stream ($\dot{Q}_{con}$), the heat transfer rate between any other medium and the conduit ($\dot{Q}_{other}$), or any combination thereof; the thermal capacitance of the conduit ($C_{con}$); the time between program cycles ($\Delta t$); the prior temperature of the conduit ($T_{con(n-1)}$); or any combination thereof.

The temperature of the conduit ($T_{con}$) may be determined by the following equation.

$$T_{con} = T_{con(n-1)} + \frac{\Sigma \dot{Q}}{C_{con}} \times \Delta t \quad \text{Eq. E}$$

The temperature of the conduit may be employed in the calculation for determining the heat transfer rate between the conduit and the air stream. The temperature of the conduit may be employed in the calculation for determining the heat transfer rate between the conduit and the environment.

Heat Transfer Rate Between the Thermal Effector and the Heat Exchanger

Typically, heat exchangers are employed with thermal effectors. The present disclosure contemplates the absence of a heat exchanger, in which case the air thermally communicates directly with a thermal effector. In some cases, the thermal effector may be integral with a heat exchanger (e.g., a resistance element adapted as a heat exchanger). In this case, the heat transfer rate between the thermal effector and the air stream may be determined in a similar method as described hereunder.

Understanding that the heat transfers disclosed herein are between two thermally communicating mediums, the same principles may be applied to any number of mediums disposed between the thermal effector and the heat exchanger (e.g., a thermal paste disposed between an effector and heat exchanger). That is, the heat transfer rate between two mediums may be determined based on the temperatures of the mediums, the surface area through which heat flows, one or more thermal resistances, or any combination thereof. Any dynamic estimation of any medium temperature may be performed in a similar manner to the dynamic estimation of temperature described herein.

As provided hereinbefore, the dynamic estimation of the air stream temperature may be at least partially based on the heat transfer rate between a heat exchanger and the air stream. In order to determine this heat transfer rate, the heat transfer rate between the thermal effector and the heat exchanger may be determined.

The method may comprise calculating the heat transfer rate between a thermal effector and a heat exchanger ($\dot{Q}_{eff}$).

The method may comprise obtaining a thermal effector temperature ($T_{eff}$) and a heat exchanger temperature ($T_{exch}$). The thermal effector temperature may be provided by an input from one or more sensors (e.g., NTC sensor). The thermal effector temperature may be determined at soak. That is, when a maintained setpoint temperature of a previous cycle is achieved after ramp-up of the temperature. The heat exchanger temperature may be assumed equal to the temperature sensed by a local sensor upon start-up of the vehicle. The heat exchanger temperature may be provided by a dynamic estimation taught herein after start-up.

The method may comprise obtaining a thermal resistance. The thermal resistance may be that of the heat exchanger ($R_{exch}$). The thermal resistance may be a pre-determined value. The thermal resistance may be unique to different materials, material thicknesses, and the like. Thus, different makes, models, and model years, with different vehicle component builds, may be associated with unique thermal resistances. The thermal resistance may be obtained from a memory storage medium. The thermal resistance may be obtained from a lookup table.

The method may comprise obtaining the surface area through which heat transfer occurs ($A_{surf}$). The surface area may be associated with the dimensions (e.g., length, width, thickness, or the like) of the heat exchanger that thermally communicate with the thermal effector.

The heat transfer rate relative to the thermal effector may be calculated from the temperature of the thermal effector ($T_{eff}$), the temperature of the heat exchanger ($T_{exch}$), the thermal resistance of the heat exchanger ($R_{exch}$), the surface area through which heat transfer occurs ($A_{surf}$), or any combination thereof.

The heat transfer rate ($\dot{Q}_{eff}$) may be determined by the following equation.

$$\dot{Q}_{eff} = \frac{(T_{exch} - T_{eff}) \times A_{surf}}{R_{exch}} \qquad \text{Eq. F}$$

One or more thermal effectors may exchange heat with the same heat exchanger. By way of example, a first thermal effector may exchange heat with a first portion of a heat exchanger and a second thermal effector may exchange heat with a second portion of the same heat exchanger. By way of another example, two or more thermal effectors may be stacked one over the other. Two or more, three or more, or even four or more thermal effectors in a stacked arrangement or acting cooperatively upon the same heat exchanger may be contemplated by the present teachings. In the case of multiple effectors, the heat transfer rate of the additional effectors may be determined in accordance with the above method and designated herein as ($\dot{Q}_{other}$).

For arrangements of side-by-side thermal effectors, the dynamic estimation of the material layer temperature, as provided hereunder, may be based on both $\dot{Q}_{eff}$ and $\dot{Q}_{other}$.

For arrangements of stacked thermal effectors, the thermal effectors may be treated as discrete layers. That is, the heat transfer rate from a first thermal effector to a second thermal effector may be calculated in a similar manner, as provided above. Then the heat transfer rate from the second effector to a heat exchanger may be calculated, as provided above.

The heat transfer rate between the one or more thermal effectors and the one or more heat exchangers may be employed in the dynamic estimation of the heat exchanger temperature.

Heat Transfer Rate Between the Heat Exchanger and the Air Stream

The heat exchanger may be disposed within a conduit. The heat exchanger may protrude at least partially into the path of the air stream. The air stream may travel over and/or through the heat exchanger. Thus, the air stream may thermally communicate with the heat exchanger.

The method may comprise calculating the heat transfer rate between the heat exchanger and the air stream ($\dot{Q}_{exch}$).

The method may comprise obtaining the heat exchanger temperature ($T_{exch}$) and the air stream temperature ($T_{air}$). The temperature of the heat exchanger may be assumed equal to the temperature sensed by a local sensor upon start-up of the vehicle. The temperature of the heat exchanger may be provided by a dynamic estimation taught herein after start-up. The temperature of the air stream may be assumed equal to the temperature sensed by a local sensor upon start-up of the vehicle. The temperature of the air stream may be provided by a dynamic estimation taught herein after start-up.

The method may comprise obtaining a thermal resistance. The thermal resistance may be that of the free convective air ($R_{air}$). The thermal resistance may be a pre-determined value. The thermal resistance may be unique to different materials, layer thicknesses, and the like. Thus, different makes, models, and model years, with different vehicle component builds, may be associated with unique thermal resistances. The thermal resistance may be obtained from a memory storage medium. The thermal resistance may be obtained from a lookup table.

The method may comprise obtaining the surface area through which heat transfer occurs ($A_{surf}$). The surface area may be associated with the dimensions of the heat exchanger that thermally communicate with the air stream.

The heat transfer rate relative to the heat exchanger may be calculated from the temperature of the heat exchanger ($T_{exch}$), the temperature of the air stream ($T_{air}$), the thermal resistance of free convective air ($R_{air}$), the surface area through which heat transfer occurs ($A_{surf}$), or any combination thereof.

The heat transfer rate relative to the heat exchanger ($\dot{Q}_{exch}$) may be determined by the following equation.

$$\dot{Q}_{exch} = \frac{(T_{air} - T_{exch}) \times A_{surf}}{R_{air}} \quad \text{Eq. G}$$

The heat transfer rate relative to the heat exchanger may be employed for the dynamic estimation of air stream temperature. The heat transfer rate relative to the heat exchanger may be employed for the dynamic estimation of heat exchanger temperature.

Dynamically Estimating the Heat Exchanger Temperature

The method may comprise dynamically estimating the temperature of the heat exchanger ($T_{exch}$). The temperature of the heat exchanger may be employed in order to determine the heat transfer rate between the thermal effector and the heat exchanger, as disclosed hereinbefore. The temperature of the heat exchanger may be employed in order to determine the heat transfer rate between the thermal effector and the air stream, as disclosed hereinbefore.

After this value is initially determined, it may be utilized by a subsequent program cycle. The temperature of the heat exchanger may be assumed to be equal to the temperature sensed by a local sensor upon start-up of the vehicle. The heat exchanger temperature may be provided by a dynamic estimation taught herein after start-up.

The method may comprise obtaining the heat transfer rate between the thermal effector and the heat exchanger, the heat transfer rate between the heat exchanger and the air stream, the heat transfer rate between any other medium (e.g., a second thermal effector) and the heat exchanger, or any combination thereof. The heat transfer rate relative to the thermal effector may be determined as disclosed hereinbefore. The heat transfer rate relative to the air stream may be determined as disclosed hereinbefore.

The method may comprise obtaining a thermal capacitance. The thermal capacitance may be that of the heat exchanger ($C_{exch}$). The thermal capacitance may be a predetermined value. The thermal capacitance may be unique to different materials, material thicknesses, and the like. Thus, different makes, models, and model years, with different vehicle component builds, may be associated with unique thermal capacitances. The thermal capacitance may be obtained from a memory storage medium. The thermal capacitance may be obtained from a lookup table.

The method may comprise obtaining a time between program cycles. The program cycle time may be constant or may vary. The program cycle time may be obtained from a memory storage medium. The program cycle time may be determined by a timer.

The method may comprise obtaining a prior temperature of the heat exchanger. The prior temperature of the heat exchanger may be assumed equal to the temperature sensed by a local sensor upon start-up of the vehicle. The prior temperature of the heat exchanger may be provided by a dynamic estimation from a prior program cycle after start-up.

The temperature of the heat exchanger may be dynamically estimated from the sum of the heat transfer rate between the thermal effector and the heat exchanger ($\dot{Q}_{eff}$), the heat transfer rate between the heat exchanger and the air stream ($\dot{Q}_{exch}$), the heat transfer rate between any other medium (e.g., a second thermal effector) and the heat exchanger ($\dot{Q}_{other}$), or any combination thereof; the thermal capacitance of the heat exchanger ($C_{exch}$); the time between program cycles ($\Delta t$); the prior temperature of the heat exchanger ($T_{exch(n-1)}$), or any combination thereof.

The temperature of the heat exchanger may be determined by the following equation.

$$T_{exch} = T_{exch(n-1)} + \frac{\Sigma \dot{Q}}{c_{exch}} \times \Delta t \quad \text{Eq. H}$$

The illustrations are meant to be exemplary of the present teachings but not limiting. That is, the order in which the method may be performed is not intended to be limited to the order in which flowcharts are illustrated. The method may be performed in any order that is practicable, as will be appreciated by the present disclosure.

Figure 2:
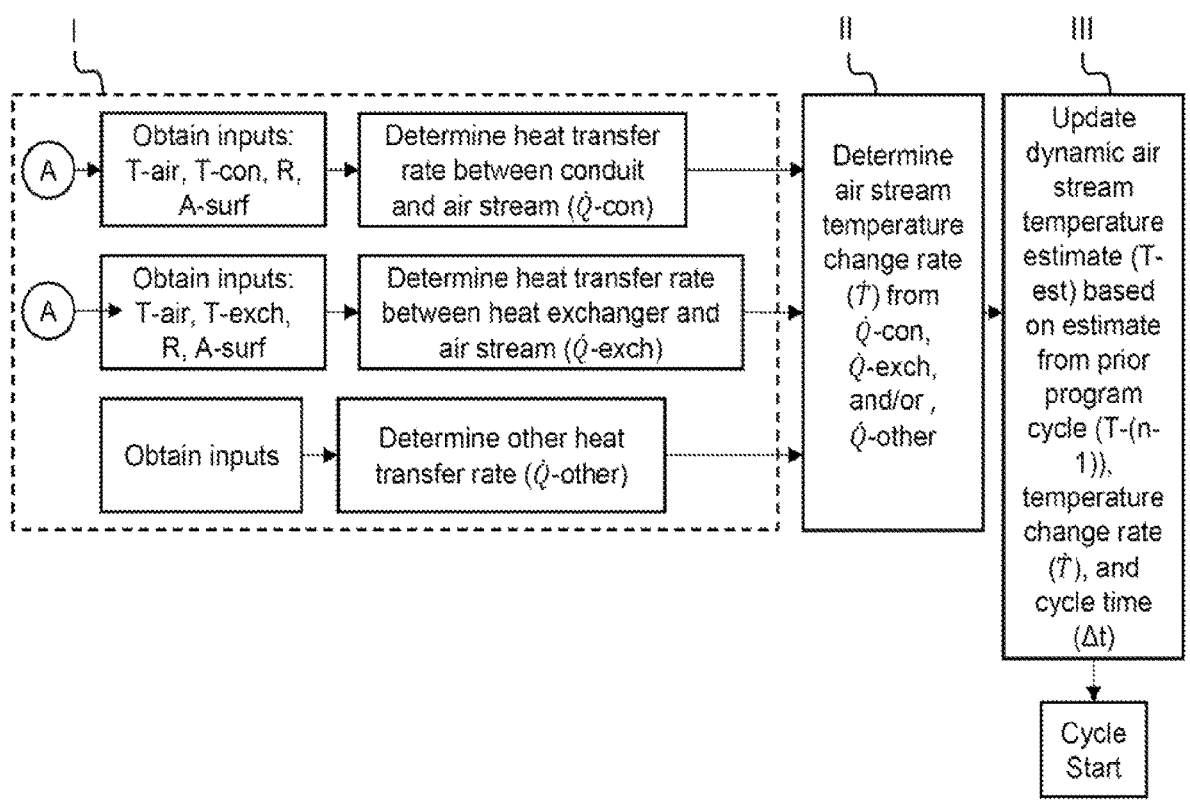
FIG. 2 illustrates a flowchart of the method of the present disclosure.

FIG. 1 illustrates a flowchart of the method of the present disclosure. The dynamic air stream temperature estimation, ultimately determined as illustrated in FIG. 2 (referring to box III), is based on the thermal communication between the air stream and its immediate surroundings. The heat exchanger disposed in the path of the air stream thermally communicates with the air stream. In order to determine the heat transfer rate therebetween, the temperature of the heat exchanger is dynamically estimated. The conduit through which the air stream flows thermally communicates with the air stream. In order to determine the heat transfer rate therebetween, the temperature of the conduit is dynamically estimated. After dynamic estimation, the temperatures are provided as input (A) with respect to FIG. 2.

Dynamic estimation of the conduit and heat exchanger temperatures are determined from the heat transfer rates between the same and any other mediums, as well as thermal capacitance, cycle time, and the temperatures of the conduit and heat exchanger from the prior cycle (denoted with (n−1)).

Upon the start of a cycle, one of two conditions may be present. First, the program cycle may occur sometime after start-up of a vehicle. Thus, inputs from prior program cycles, in this case the heat exchanger, conduit, and air stream temperatures, may be utilized. Moreover, effector temperature and environment temperature are typically provided by local sensors in a vehicle. The present disclosure contemplates that the environment temperature may be dynamically estimated in accordance with the present teachings. Second, the program cycle may occur upon start-up of the vehicle. Thus, inputs from prior program cycles, in this case the heat exchanger, conduit, and air stream temperatures, are not available. Assumptions may be made about these inputs. Upon start-up, the heat exchanger, conduit, and air stream temperatures may be assumed to be equal to the temperature sensed by any local sensors. These sensors may include those disposed in the cabin, on heating elements, in vent outlets, or otherwise. Any sensors located in the vehicle may provide the temperature at start-up.

The temperatures of the conduit and heat exchanger calculated in this step may be updated in a memory storage medium to be used for a subsequent heat transfer rate determinations. The temperature of the air stream may be obtained from the method illustrated in FIG. 2, from a prior program cycle.

The temperatures of the conduit, heat exchanger, and air stream may be utilized as an input (A) for the method illustrated in FIG. 2.

FIG. 2 illustrates a flowchart of the method of the present disclosure. The dynamic air stream temperature estimate (referring to box III) is based on the estimate from a prior program cycle, the temperature change rate influenced by heat transfer rates with respect to the air stream, and the program cycle time.

The dynamic air stream temperature estimate from the prior cycle is generally known after start-up. Upon start-up, the air stream temperature may be assumed to be equal to the temperature sensed by a local sensor. The program cycle time can be a fixed value stored in a memory storage medium or a variable value determined by a timer.

The temperature change rate is determined (referring to box II) based on the heat transfer rates with respect to the air stream. Generally, this includes the heat transfer rate between the conduit and the air stream, the heat transfer rate between the heat exchanger and the air stream, and any other heat transfer rate in the system. These heat transfer rates (referring to box I) are determined as follows.

The heat transfer rate between the conduit and the air stream is based on the conduit temperature, the air stream temperature, the thermal resistance, and the surface area through which heat transfer occurs. The air stream temperature may be obtained from a prior program cycle or assumed equal to the temperature sensed by any local sensors, as described above. The conduit temperature may be obtained as illustrated in FIG. 1 and provided as input (A).

The heat transfer rate between the heat exchanger and the air stream is based on the heat exchanger temperature, the air stream temperature, the thermal resistance, and the surface area through which heat transfer occurs. The air stream temperature may be obtained from a prior program cycle or assumed equal to the temperature sensed by any local sensors, as described above. The heat exchanger temperature may be obtained as illustrated in FIG. 1 and provided as input (A).

Given a known program cycle time, the dynamic estimation of air stream temperature may be determined based on the change in temperature and the dynamic air stream temperature estimate from the prior program cycle. After the dynamic estimation, the cycle restarts with the method illustrated in FIG. 1.

Figure 3:
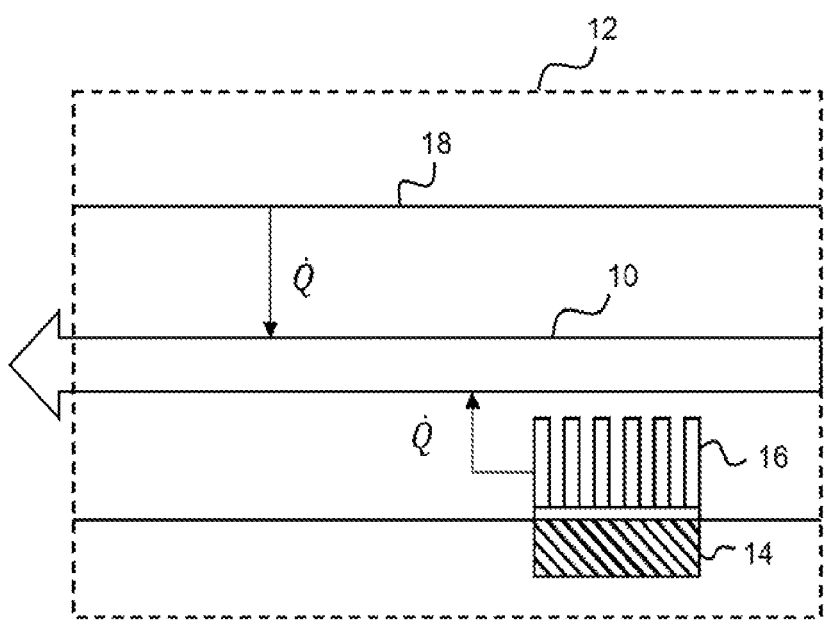
FIG. 3 illustrates a system according to the present teachings.

FIG. 3 illustrates a thermally regulated airstream 10. As illustrated, the airstream 10 is expelled from a vehicle component 12. The airstream 10 is thermally regulated by a thermal effector 14 (e.g., thermoelectric device). Heat generated by the thermal effector 14 is ultimately conducted to the airstream 10. As illustrated, the thermal effector 14 and airstream 10 thermally communicate with a heat exchanger 16. The present teachings contemplate that no heat exchanger 16 may be present.

Control of the thermal effector 14 is ultimately determined by the heat transfer rate relative to the airstream 10 required to achieve a setpoint temperature. Heat transfer rates are indicated by labelled arrows. The setpoint temperature can be directed by an occupant and/or an autonomous control system. Since the airstream 10 is subject to a plurality of different heat transfer rates relative to different elements in the system, the thermal effector 14 may function cooperatively or in counteraction to those different heat transfer rates. By way of example, where an airstream 10 is to be heated, heat transfer from the thermal effector 14 to the airstream 10 may function cooperatively with heat transfer from a conduit 18, through which the airstream 10 travels, to the airstream 10. By way of another example, where an airstream 10 is to be heated, heat transfer from the thermal effector 14 to the airstream 10 may function to counteract heat transfer from the airstream 10 to a cold conduit 18 (cold relative to the temperature of the airstream 10).

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

The method may comprise one or more of the steps recited herein. Some of the steps may be duplicated, removed or eliminated, rearranged relative to other steps, combined into one or more steps, separated into two or more steps, or a combination thereof.

The flow charts described herein do not imply a fixed order to the steps, and embodiments of the present invention may be practiced in any order that is practicable, unless otherwise specified herein.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components. or steps.

What is claimed is:

1. A method for estimating a temperature of an air stream at or proximate to an outlet, the method comprising:
    determining a first heat transfer rate to or from the air stream based on a first temperature applied to the air stream;
    determining a second heat transfer rate to or from the air stream based on a second temperature applied to the air stream by a conduit through which the air stream travels;
    calculating a rate of change of the air stream temperature based on the first and second heat transfer rates and optionally one or more additional heat transfer rates; and
    updating an estimated temperature of the air stream from a prior program cycle based on the rate of change of the air stream temperature and the estimated air stream temperature from the prior program cycle;
    wherein the air stream is forced to the outlet by a blower and expelled from the outlet into a vehicle cabin, the first and second temperatures being applied to the air stream between the blower and the outlet.

2. The method according to claim 1, wherein the first temperature is applied by a heat exchanger.

3. The method according to claim 2, wherein the heat exchanger is located on and/or within the conduit through which the air stream travels.

4. The method according to claim 3, wherein the method comprises:
    obtaining the first temperature, and
    obtaining the estimated air stream temperature from the prior program cycle;
    wherein the first heat transfer rate is calculated from thea difference between the first temperature and the estimated air stream temperature from the prior program cycle, a first thermal resistance, a first surface area through which heat transfer occurs, or any combination thereof.

5. The method according to claim 4, wherein if a prior program cycle value is not available, the estimated air stream temperature is substituted with a temperature sensed by a local sensor.

6. The method according to claim 5, wherein the first thermal resistance is that of the heat exchanger.

7. The method according to claim 6, wherein the second temperature is applied by the conduit from a region where the air stream enters the conduit to thea region where the outlet is located.

8. The method according to claim 7, wherein the method comprises:
    obtaining the second temperature, and
    obtaining the estimated air stream temperature from the prior program cycle;
    wherein the second heat transfer rate is calculated from a difference between the second temperature and the estimated air stream temperature from the prior program cycle, a second thermal resistance, a second surface area through which the heat transfer occurs, or any combination thereof.

9. The method according to claim 8, wherein the second thermal resistance is that of free convective air.

10. The method according to claim 9, wherein the air stream is emitted from the outlet of a vehicle component.

11. The method according to claim 10, wherein the vehicle component includes a seat, a headrest, a door panel, an instrument panel, a headliner, a center console, a leg panel, or any combination thereof.

12. The method according to claim 11, wherein the heat exchanger thermally communicates with one or more thermal effectors; and
    wherein the method comprises determining a heat transfer rate between the one or more thermal effectors and the heat exchanger, based on a temperature of the one or more thermal effectors.

13. The method according to claim 12, wherein the temperature of the one or more thermal effectors are inputs provided by sensors;
    wherein the sensors include a negative temperature coefficient (NTC) resistor, a resistance temperature detector (RTD), a thermocouple, a semiconductor-type sensor, or any combination thereof.

14. The method according to claim 13, wherein the conduit thermally communicates with an environment; and
    wherein the method comprises determining a heat transfer rate to or from the conduit, based on a temperature applied to the conduit by the environment.

15. The method according to claim 11, wherein the vehicle component is the seat.

16. The method according to claim 15, wherein the conduit extends through the seat.

17. The method according to claim 16, wherein the airstream is emitted from a headrest of the seat.

* * * * *